No. 12,345. REISSUED MAY 16, 1905.

E. G. CAUGHEY.

CARLINE.

APPLICATION FILED JULY 18, 1904.

WITNESSES.

J. R. Keller

G. Kremer

INVENTOR.

Edward G. Caughey

By Kay, Fellen & Hunter Attys.

No. 12,345. Reissued May 16, 1905.

UNITED STATES PATENT OFFICE.

EDWARD G. CAUGHEY, OF BUTLER, PENNSYLVANIA, ASSIGNOR TO STANDARD STEEL CAR COMPANY, OF PITTSBURG, PENNSYLVANIA, A CORPORATION OF PENNSYLVANIA.

CARLINE.

SPECIFICATION forming part of Reissued Letters Patent No. 12,345, dated May 16, 1905.

Original No. 752,282, dated February 16, 1904. Application for reissue filed July 18, 1904. Serial No. 217,148.

*To all whom it may concern:*

Be it known that I, EDWARD G. CAUGHEY, a resident of Butler, in the county of Butler and State of Pennsylvania, have invented a new and useful Improvement in Carlines; and I do hereby declare the following to be a full, clear, and exact description thereof.

My invention relates to metallic carlines for box and similar cars; and it consists in the carline hereinafter described and claimed.

Figure 1:
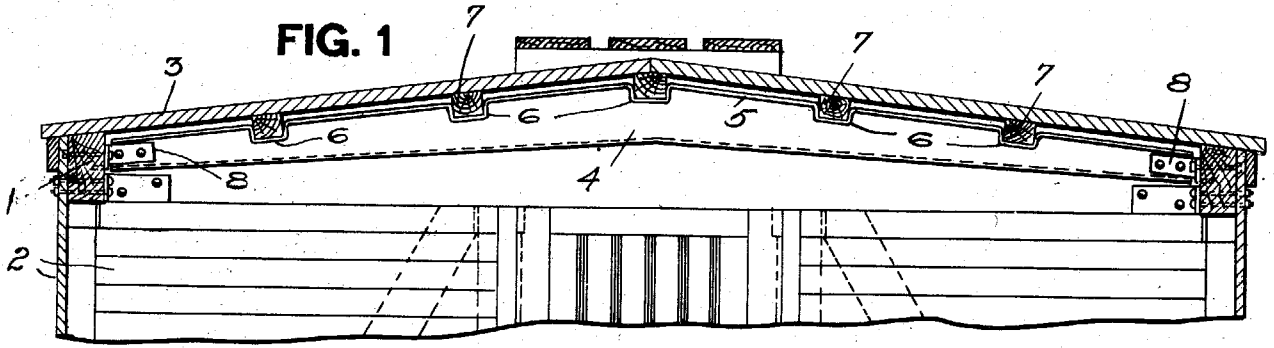
Figure 2:
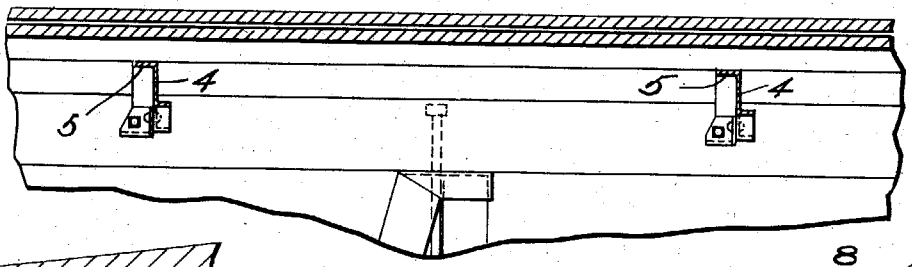
Figure 4:
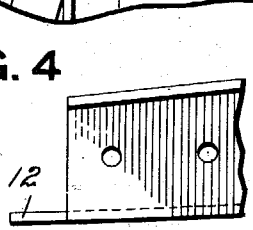
Figure 3:
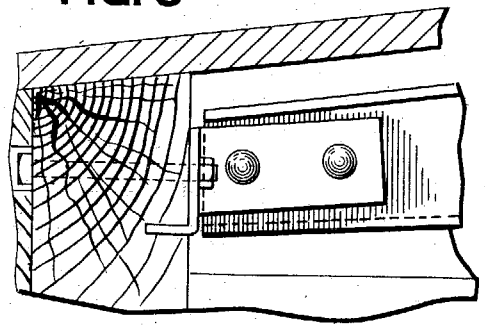

In the accompanying drawings, Figure 1 is a cross-section through the upper portion of an ordinary box-car, showing my improved carline applied thereto. Fig. 2 is a longitudinal section through the top of the car, taken at the center of the car, showing the carline in cross-section. Fig. 3 is a section showing a side view of one end of the carline. Fig. 4 is a side view of one end of the carline, and Fig. 5 is a perspective view of the bracket for securing the carline to the side plate of the car.

My carline may be employed with any form of box or similar cars, and in the drawings it is shown applied to an ordinary box-car having the top side plate 1, side and end walls 2, and roof 3. The carline 4 is formed of a plate of metal pressed to shape and of a general Z shape in cross-section, as shown in Fig. 2. It preferably is of varying cross-section, as shown, being deepest at the center of the car and tapering toward the ends and is somewhat bow-shaped, as shown in Fig. 1, to give the necessary slope to the roof of the car. The upper flange 5 and a portion of the web of the carline are indented at several places to provide depressions or pockets 6 for receiving the wooden purlins 7, which support the roof. The latter can be conveniently secured to the carline by being bolted to the upper flange of the carline.

Figure 5:
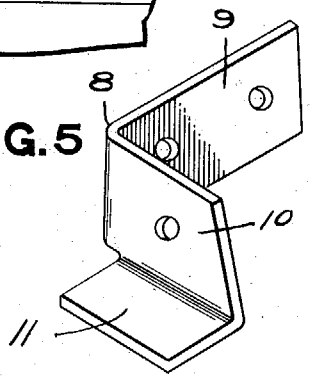

The carline is secured to the sides of the car by means of a metallic bracket 8, which preferably is of double-angle form, as shown in Fig. 5, having one flange 9 riveted or bolted to the web of the carline, another flange 10 resting against the side plate of the car and riveted or bolted thereto, and the third flange 11 fitting in a suitable recess in the side or side plate of the car. The projecting flange 11 of the supporting-bracket fitting in the recess removes a large part of the weight of the carline and of the roof from the bolts, so that the shearing strain on the latter is much lessened. If preferred, the flange 11 on the bracket 8 may be omitted and one of the flanges of the carline—as, for instance, the lower flange—may extend beyond the ends of the web and the other flange, as shown at 12, and fit into a recess in the side plate of the car, this projection serving to assist in supporting the carline in the same manner as the flange 11 of the bracket 8. The carline is of simple shape, easy to make, and its cross-section is such as to secure the most effectual distribution of the metal therein.

What I claim is—

1. A metallic carline of varying Z-shaped cross-section having one of its flanges and a portion of its web indented or depressed to receive the purlins and having its lower flange projecting beyond the web at the ends of the carline.

2. A metallic carline consisting of a flanged shape, and metallic brackets each having a vertical portion secured to the webs of said carline at its ends and provided with a flat horizontal flange projecting outwardly in the direction of the length of the carline.

3. A metallic carline consisting of a metallic member Z-shaped in cross-section, and metallic brackets secured to said carline at its ends, said brackets having a vertical portion secured to the web of the carline, a vertical portion at right angles thereto adapted to bear against the car side, and a flat horizontal portion at right angles to said last-named vertical portion and projecting outwardly in the direction of the length of the carline.

4. A sheet or plate metal roof-carline having an integral body comprising a vertical web which gradually diminishes in depth from its middle toward its ends, an upper lateral flange projecting from one side of the web, and a lower lateral flange projecting from the opposite side of the web.

In testimony whereof I, the said EDWARD G. CAUGHEY, have hereunto set my hand.

EDWARD G. CAUGHEY.

Witnesses:
JAMES I. KAY,
J. C. FIFE.